United States Patent [19]

Frei

[11] Patent Number: 5,312,020
[45] Date of Patent: May 17, 1994

[54] DRINK MACHINE FOR SELECTIVELY PREPARING AND DISPENSING BEVERAGES

[75] Inventor: Hanspeter Frei, Oetwil, Switzerland

[73] Assignee: CIS Elektrogerate AG, Hinwil, Switzerland

[21] Appl. No.: 967,682

[22] Filed: Oct. 26, 1992

[30] Foreign Application Priority Data

Nov. 13, 1991 [DE] Fed. Rep. of Germany ....... 4137324

[51] Int. Cl.⁵ ............................................. A47J 31/00
[52] U.S. Cl. ........................ 222/129.1; 222/129.3; 222/142; 222/145; 222/146.2; 222/236; 222/333
[58] Field of Search ................. 222/129.1, 138, 142, 222/144.5, 145, 146.2, 333, 236, 129.2, 129.3, 129.4; 221/75, 124

[56] References Cited

U.S. PATENT DOCUMENTS

| | | | |
|---|---|---|---|
| 2,614,738 | 10/1952 | Mills | 222/129.3 X |
| 2,771,914 | 11/1956 | Pinney | 222/142 X |
| 3,133,675 | 5/1964 | Broadhurst | 222/129.1 |
| 4,068,781 | 1/1978 | Toth | 222/129.1 X |
| 4,487,337 | 12/1984 | DeJardins | 222/236 X |
| 4,560,088 | 12/1985 | Tan | 221/75 |
| 4,595,131 | 6/1986 | Ruskin et al. | 222/129.1 X |
| 4,681,241 | 7/1987 | Olofsson et al. | 221/124 |
| 5,024,350 | 6/1991 | Shoemaker, Jr. | 221/75 |
| 5,088,625 | 2/1992 | Farber et al. | 222/129.1 |
| 5,150,821 | 9/1992 | Iwasaki et al. | 222/144.5 X |

FOREIGN PATENT DOCUMENTS 2137520 10/1984 United Kingdom ............. 222/129.4

Primary Examiner—Andres Kashnikow
Assistant Examiner—Anthoula Pomreninz
Attorney, Agent, or Firm—Tarolli, Sundheim & Covell

[57] ABSTRACT

The invention provides a drink machine for preparing and dispensing different hot and cold beverages. It comprises a plurality of beverage powder stock containers, each container being equipped with a feeding worm. Gearing units assigned to each stock container can be selectively coupled via a gearing unit to a common driving motor by actuating an electromagnet to operate the feeding worm of a selected beverage powder stock container. Thus, only one single driving motor is required to selectively operate all driving worms of the stock container. By this design, the feeding worms can easily be operated intermittently such that the overall quality of the prepared beverage is improved.

14 Claims, 5 Drawing Sheets

DRINK MACHINE FOR SELECTIVELY PREPARING AND DISPENSING BEVERAGES

BACKGROUND OF THE INVENTION

The present invention refers to a drink machine for selectively preparing and dispensing different hot and-/or cold drinks prepared by dissolving a beverage powder in hot and/or cold water. Such a drink machine comprises as the main components a housing, a water-heater or boiler, a pump for feeding the water, a plurality of stock containers adapted to receive a stock of beverage powder, at least one mixing device for mixing the beverage powder with the water, and a control unit for controlling the preparation of the different drinks.

Each of the stock containers comprises feeding means for feeding the beverage powder contained in the stock containers to the mixing device.

PRIOR ART

Drink machines of this kind are well known for a quite long time and are placed at various locations for selectively preparing and dispensing different beverages, particularly coffee, hot chocolate, tea, soups etc. Usually, the user of such a drink machine has the choice between a hot drink and a cold drink, particularly as far as tea and chocolate drinks are concerned. Usually, the beverage is prepared only after inserting a coin or a jetton or after a credit card has been debited. However, there are also drinks machines which prepare and dispense a beverage without cost by simply pressing a select button.

Different criteria have to be fulfilled by such a drinks machine. First, they must not be expensive in manufacture since a hard competition exists in this field. Further, the drinks machine must operate reliably because an interruption of the operation not only irritates the user of the machine, but also reduces the profit of the operator or proprietor of the machine. Still further, such drink machines should be designed and constructed such that a faulty operation can be fixed easily and quickly. Particularly, the parts and elements which are subjected to wear should be placed in the machine such that they are easily accessible and can be quickly replaced. Still further, the drink machine should be constructed such that parts and elements which are subjected to contamination can be easily removed and cleaned.

Finally, a further requirement is that the drink machine can be enlarged as far as the number of the drinks is concerned; this means, it should be constructed such that an extension for offering a wider variety of beverages is easily possible at a later date.

The selection and preparation of a beverage with such a drink machine is performed approximately as follows:

The user selects the beverage which he desires to drink by means of a select button on the drink machine. Thereafter, a beaker for collecting the selected beverage is brought into position. Now, the water pump is switched on. The water fed by the water pump passes a water-heater or boiler, if the user has selected a hot drink, and a mixing unit and finally flows into the beaker. If a cold drink is selected, the water-heater or boiler is by-passed. When the water passes the mixing unit, a certain amount of beverage powder fed from a stock container to the mixing unit is admixed.

As soon as the user has selected a certain beverage and pushes the corresponding button, this is recorded by a built-in microprocessor control unit and the corresponding program is started. The microprocessor control unit has stored a corresponding program for every beverage that can be prepared by the drinks machine. If, for example, a hot chocolate is selected, the built-in microprocessor control unit knows that for the preparation of such a beverage 2 dl of hot water and 10 grams of chocolate powder are required. For the reason of cost and simplicity, the dosing of the chocolate powder is realized such that the required amount of beverage powder is controlled by the time of operation of the powder feeder.

For the preparation of a hot chocolate, the pump for feeding the water must operate appr. 20 seconds. This period of time is relatively high because the cold water is heated in a constant flow water heater which cannot be passed by the water too quickly. The time during which the beverage powder is dosed comes to appr. 6 seconds for the required amount. The beverage powder is admixed to the hot (or cold) water flowing through the mixing device with the result that the selected hot chocolate is already well mixed when it is collected in the beaker.

The time during which beverage powder is admixed to the water is considerably shorter than the time during which water flows. In practice, the user has the impression that a real hot chocolate is collected by the beaker only during appr. 8 seconds, while only hot water is filled into the beaker during the remaining 12 seconds. This can have an undesired psychological effect as the user has the impression that he gets only less than half of the selected beverage for his money, and on the other hand, there is a danger that the user removes the beaker prior to the end of the water supply because the user has the impression that the water flowing into the beaker is not part of the selected beverage. The disadvantage is that the sump for collecting excessive liquid which is required in every drink machine is quickly filled and must be often emptied in order to avoid an overflow.

The period of time during which beverage powder is dosed into the mixing unit cannot be simply increased in order to pretend that evidently a hot chocolate beverage is filled into the beaker during the entire preparation period. The reason is that in preparing an espresso coffee, which requires admixing a relatively large amount of beverage powder to a small amount of water, the contrary would happen; this means, the required amount of beverage powder could not be admixed to the hot water during the period of time in which the water flows through the constant flow water heater. The amount of beverage powder fed per time unit cannot be simply altered because this would require a much more complicated control unit for the driving motor of the feeding means.

The drink machines known in the art comprise a separate driving motor and gearing unit for the operation of the beverage powder feeding means for every beverage powder stock container. This means that a drink machine offering six different beverages requires six driving motors and six gearing units.

OBJECTS OF THE INVENTION

It is an object of the invention to improve a drink machine of the kind referred to such that the disadvantages mentioned hereinbefore are avoided.

Particularly, it is an object of the invention to improve a drink machine of the kind referred to such that it can be manufactured simpler and with less expenditure than drink machines known in the art, resulting in a considerably lower price.

It is a still further object of the invention to improve a drink machine of the kind referred to such that the operator or proprietor of the machine has the possibility to exchange worn or defective parts himself quickly and easily.

SUMMARY OF THE INVENTION

To achieve these and other objects, the invention provides a drink machine for selectively preparing and dispensing different hot and/or cold drinks prepared by dissolving a beverage powder in hot and/or cold water. The drink machine comprises a housing, a water-heater or boiler, a pump for feeding the water, a plurality of stock containers adapted to receive a stock of beverage powder, at least one mixing device for mixing the beverage powder with the water, and a control unit for controlling the preparation of the different drinks.

Each stock container comprises feeding means for feeding the beverage powder contained in the stock containers to the mixing device.

A single driving motor is provided for driving the feeding means. The single driving motor is common to all of feeding means. The machine further comprises a plurality of gearing units whereby each one gearing unit is assigned to each one of the beverage powder stock containers.

Each gearing unit has a drive shaft connected to the common driving motor and a driven shaft for driving the feeding means assigned to the particular gearing unit. For selectively electro-mechanically coupling or disengaging each separate gearing unit to or from, respectively, the feeding means assigned to this particular gearing unit, electromagnets can be provided in each gearing unit.

With this construction in mind, a particularly advantageous embodiment of the invention can be realized in which the beverage powder is fed to the water flowing through the mixing device intermittently during the entire preparation cycle. In order to couple or disengage the drive shaft of the gearing unit, which is driven by the driving motor, to the feeding means in the beverage powder stock container, it's just necessary to switch the assigned electromagnet on or off. That's how it is at all possible to realize an intermittent dosing of the beverage powder because the relatively high inertia which is characteristic for an electric motor with coupled gearing has no effect in this case; thus, an intermittent feeding and dosing in short periods is possible.

A further particularly interesting embodiment may be seen in a design where the beverage powder stock containers and the gearing units with incorporated electromagnets assigned thereto are constituted by individual modules. Thereby, it is possible to enhance the capacity of such a drinks machine at a later date by simply adding further modules if there is enough space in the interior of the housing.

In order to interconnect the drive shafts and, thus, the worm wheels of the individual gearing units, resilient connecting members may be provided; the advantage gained therewith is that axial and radial positioning tolerances of the modules can be compensated.

A still further advantage of the proposed modular design is that the same modules may be used, either for a simple drink machine intended for preparing just coffee, or for more sophisticated drinks machines which offer a selection of three, four or more different beverages. Also in the case of service or repair, the modular design is advantageous. In the case if certain parts or elements are worn or defective, the entire module essentially comprising a frame, an axially displaceable shaft with a gear wheel, a shaft with a worm wheel and an electromagnet can be replaced easily and quickly, or the module can be removed from the drink machine, the defective parts can be replaced and the repaired module can be reinserted into the machine.

BRIEF DESCRIPTION OF THE DRAWINGS

In the following, an embodiment of the drink machine according to the invention will be further described, with reference to the accompanying drawings, in which.

DETAILED DESCRIPTION OF AN EMBODIMENT

Figure 1:
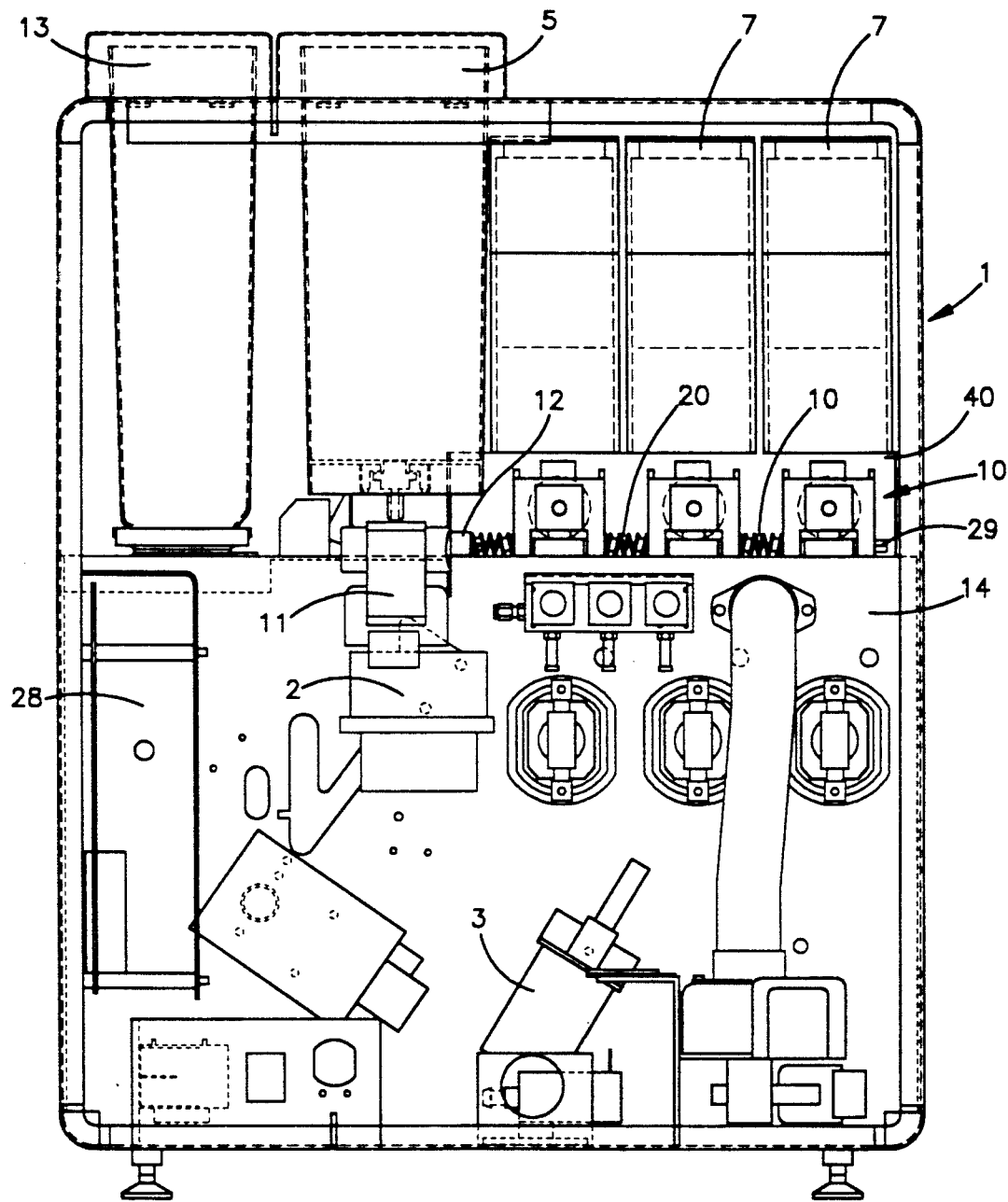
FIG. 1 a schematic longitudinal sectional view of the drink machine according to the invention along a first vertical plane running parallel to the front or back of the drink machine.

FIG. 1 shows in a schematic and simplified view the basic design of an embodiment of a drinks machine according to the invention. A housing 1 comprises a mounting plate 14 to which are fixed, amongst other elements of the machine which are not essential for the present invention, a water-heater or boiler 2, a feeding pump 3 and a driving motor 11. A fixing rail 40 is mounted on the top end of the mounting plate 14. A plurality of gearing modules 10 the design and construction of which will be explained in detail hereinafter are suspended on the fixing rail. Further arranged in the interior of the housing 1, in its upper part, are a container 5 for receiving fresh cold water as well as a plurality of beverage powder stock containers 7. Furthermore, the housing 1 contains a control unit 28 for controlling the preparation of the various beverages. Such a control unit 28 being of conventional design and well known to any person skilled in the art removes the need to further describe it in detail.

If required, the housing 1 further may contain a stock container 13 for receiving coffee beans as well as a coffee bean milling device (not shown) for the preparation of pure or real coffee. In order to improve the clarity of the drawings, the connection pipes and tubes required for the operation of the drinks machine are not shown in the drawing.

Figure 2:
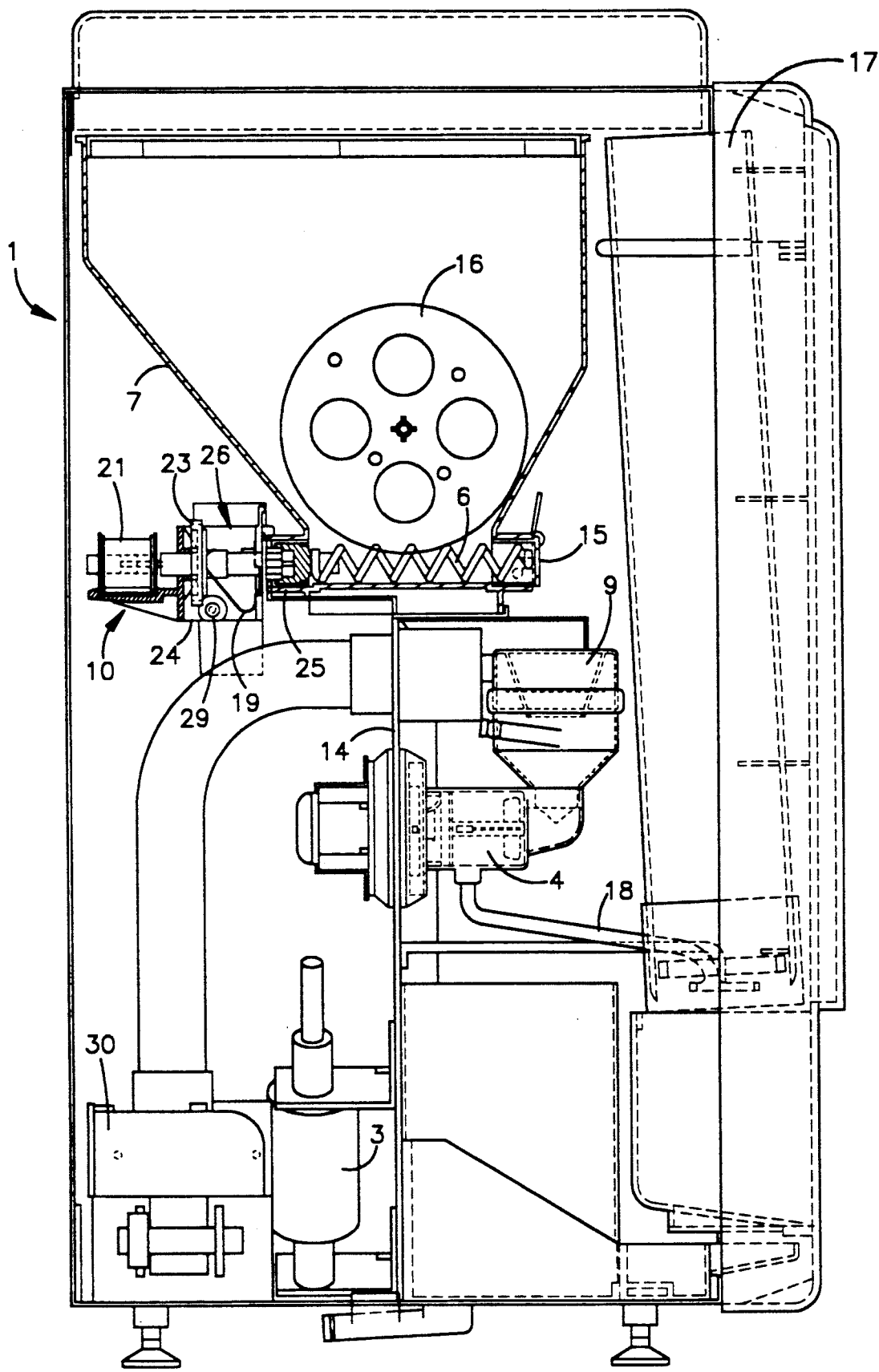
FIG. 2 a schematic longitudinal sectional view of the drink machine according to the invention along a second vertical plane running parallel to the side faces of the drink machine.

The longitudinal sectional view of the embodiment of the drinks machine according to FIG. 2 shows the beverage powder stock container 7 and a rotatable feeding worm 6 as well as a rotatable mixing wheel 16 driven by the feeding worm 6, both arranged in the interior of the stock container 7. The mixing wheel 16 supports the problem-free feeding of the beverage powder contained in the stock container 7 by means of the feeding worm 6. The beverage powder fed by the feeding worm 6 opens a flap 15 pivotally mounted at the outlet opening of the stock container 7 such that the beverage powder passes the outlet opening of the stock container 7 and falls down into a hopper 9 of a mixing device 4. The mixing device 4 is also connected to the water supply, i.e. the fresh water container 5 and, if required, the water-heater or boiler 2, in order to dissolve the beverage powder in the water flowing through the mixing device 4. The beverage powder and water being thoroughly mixed, the final beverage passes through a pipe 18 into a beaker (not shown) placed below the outlet opening of the pipe 18.

The drink machine of the invention further comprises an extraction fan device 30; this device 30 prevents the beverage powder situated in the region of the flap 15 to get sticky under the influence of vapor which results from the preparation of hot beverages. Tubes 17 shown in FIG. 2 serve as stock containers for the (not shown) beverage beakers.

Figure 3:
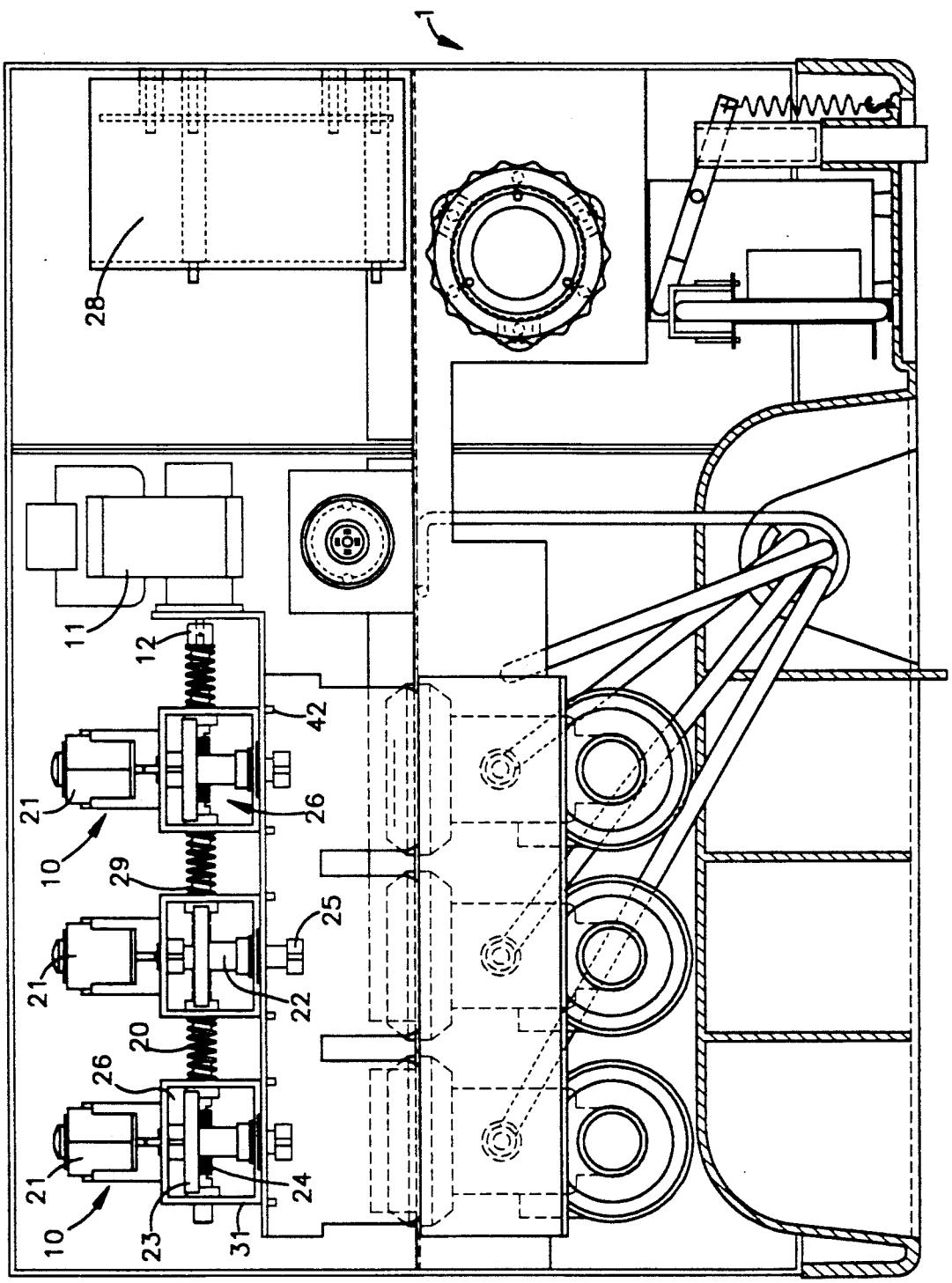
FIG. 3 a schematic cross sectional view of the drink machine according to the invention along a horizontal plane.

In the present embodiment, as shown in the drawings, there are provided three beverage powder stock containers 7, each of them containing a feeding worm 6. In order to selectively drive one of these feeding worms 6 to a rotational motion, there is provided, as can be seen in FIG. 3, a common driving motor 11 and three gearing modules 10. Each one of the gearing modules 10 is assigned to each one of the beverage powder stock containers 7. Each module 10 has a drive shaft 29. The drive shafts 29 of all three gearing modules 10 are aligned with reference to each other along a common axis. The driving motor 11 comprises a drive shaft 12 which also is aligned with reference to the drive shafts 29 of the gearing modules, i.e. the drive shafts 29 of the gearing modules 10 and the drive shaft 12 of the driving motor 11 all rotate around a common axis of rotation.

Each of the drive shafts 29 of the gearing modules 10 are provided with a worm wheel 24 as will be further explained later. The drive shaft 12 of the driving motor 11 is connected to one end of the drive shaft 29 and thereby to the worm wheel 24 of a first gearing unit 26 forming part of a first gearing module 10 by means of a resilient connecting member 20, e.g. a coil spring. The other end of the drive shaft 29 of the first gearing unit 26 is connected to the one end of the drive shaft 29 and thereby to the worm wheel 24 of a second gearing unit 26 forming part of a second gearing module 10 by means of a resilient connecting member 20, e.g. a coil spring. The other end of the drive shaft 29 of the second gearing unit 26 is connected to the one end of the drive shaft 29 and thereby to the worm wheel 24 of a third gearing unit 26 forming part of a third gearing module 10 by means of a resilient connecting member 20, e.g. a coil spring. Thus, all three drive shafts 29 of the three gearing modules 10 and, thereby, all three worm wheels 24 are connected to each other as well as to the drive shaft of the driving motor 11 such that they can be simultaneously driven to a rotational movement by operating the driving motor 11. The reason for the provision of resilient connecting members 20 is for compensating of eventually occurring mounting tolerances of the three gearing modules 10.

The gearing unit 26 of the middle out of the three gearing modules 10 shown in FIG. 3 is in its engaged position. This means that, in this position, the driving motor 11 rotates the feeding worm 6 of the middle beverage powder stock container 7 by means of the middle gearing unit 26; the worm wheels 24 of the two other gearing units 26, of course, are also driven to a rotational motion, but since these two gearing units are not in their engaged position, the gear wheels 23 thereof and, thereby, the feeding worms 6 of the left and right beverage powder stock containers 7 are not operated.

Figure 4:
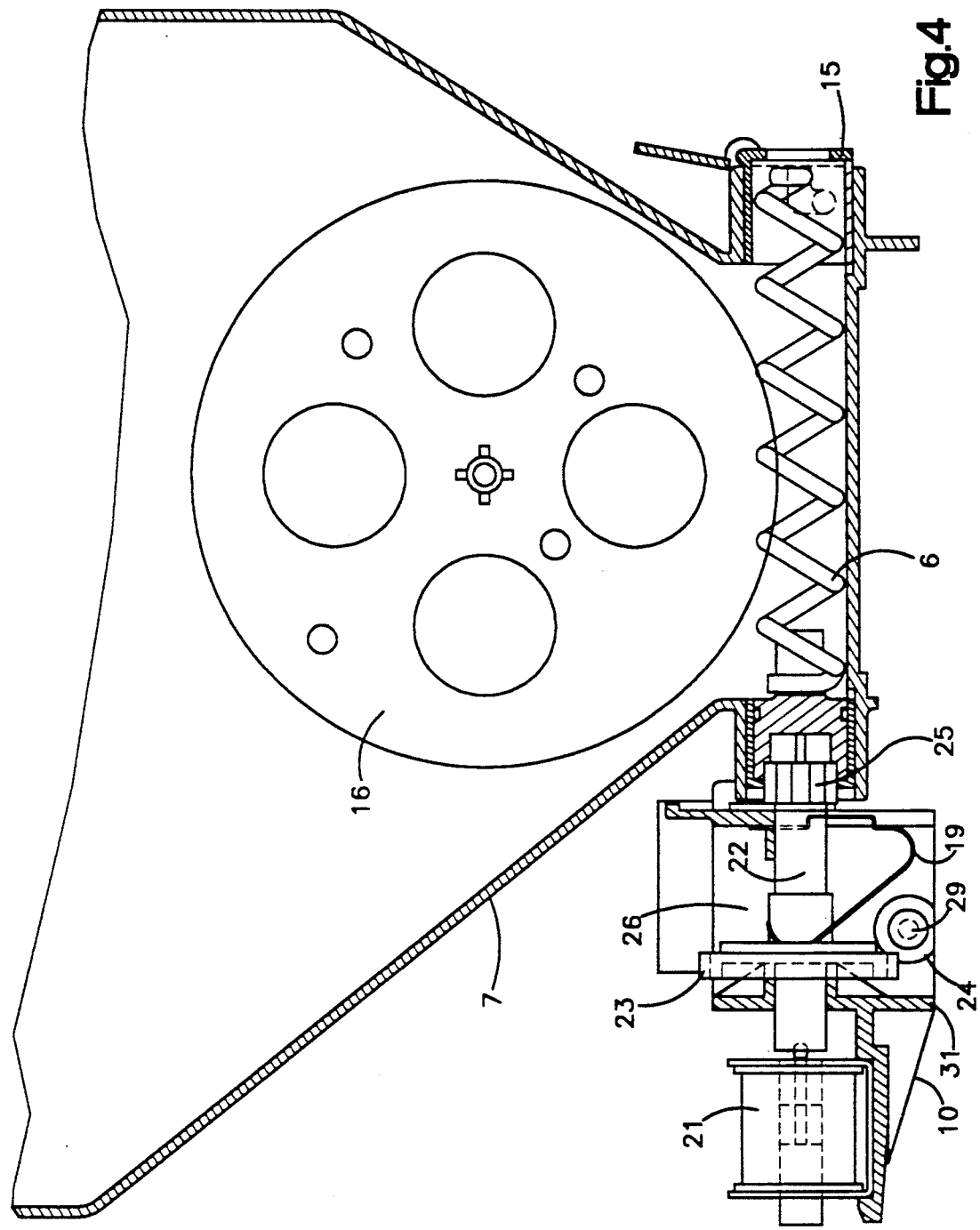
FIG. 4 a partial view similar to FIG. 2 in an enlarged scale.

From FIG. 4, the construction and the operation of the gearing unit 26 in connection with the feeding worm 6 is evident. The gearing module 10 comprises a supporting frame 31. An axially movable driven shaft 22 is rotatably mounted in the supporting frame 31. Further, running perpendicularly to the driven shaft 22, a drive shaft 29 incorporating a worm wheel 24 is rotatably mounted in the supporting frame 31. In coaxial relationship to the driven shaft 22, there is provided an electromagnet 21 which is also fixed to the supporting frame 31. The driven shaft 22 is provided with a gear wheel 23 located in the interior of the supporting frame 31 as well as with a coupling member 25 fixed to that end of the driven shaft which faces the feeding worm 6 and located outside of the supporting frame 31. The other end of the driven shaft is operatively connected to the electromagnet 21.

If the electromagnet 21 is energized, the driven shaft 22 is axially displaced toward the feeding worm 6. Thereby, the gear wheel 23 engages the worm wheel 24 of the drive shaft 29, and simultaneously, the driven shaft 22 is operatively coupled to the feeding worm 6 by means of the coupling member 25. Thus, an operative driving connection between the drive shaft 29 of the gearing unit 26 and the feeding worm 6 is established.

The gearing unit 26 further comprises a spring member 19 mounted between a side flange of the supporting frame 31 and the gear wheel 23. The spring member 19 is biased such that it exerts a force on the gear wheel 23 and, thereby, on the axially displaceable driven shaft 22. Thus, under the influence of the spring member 19, the driven shaft 22 is forced to move in its disengaged position; this means, that the driven shaft 22 is only coupled to the feeding worm 6 and the gear wheel 23 is engaged with the worm wheel 24 only as long as the electromagnet 21 is energized. As soon as the power to the electromagnet 21 is shut off, the driven shaft 22 is displaced toward the electromagnet 21, the gear wheel 23 is out of engagement with the worm wheel 24 and the driven shaft 23 is no longer coupled to the feeding worm 6.

Figure 5:
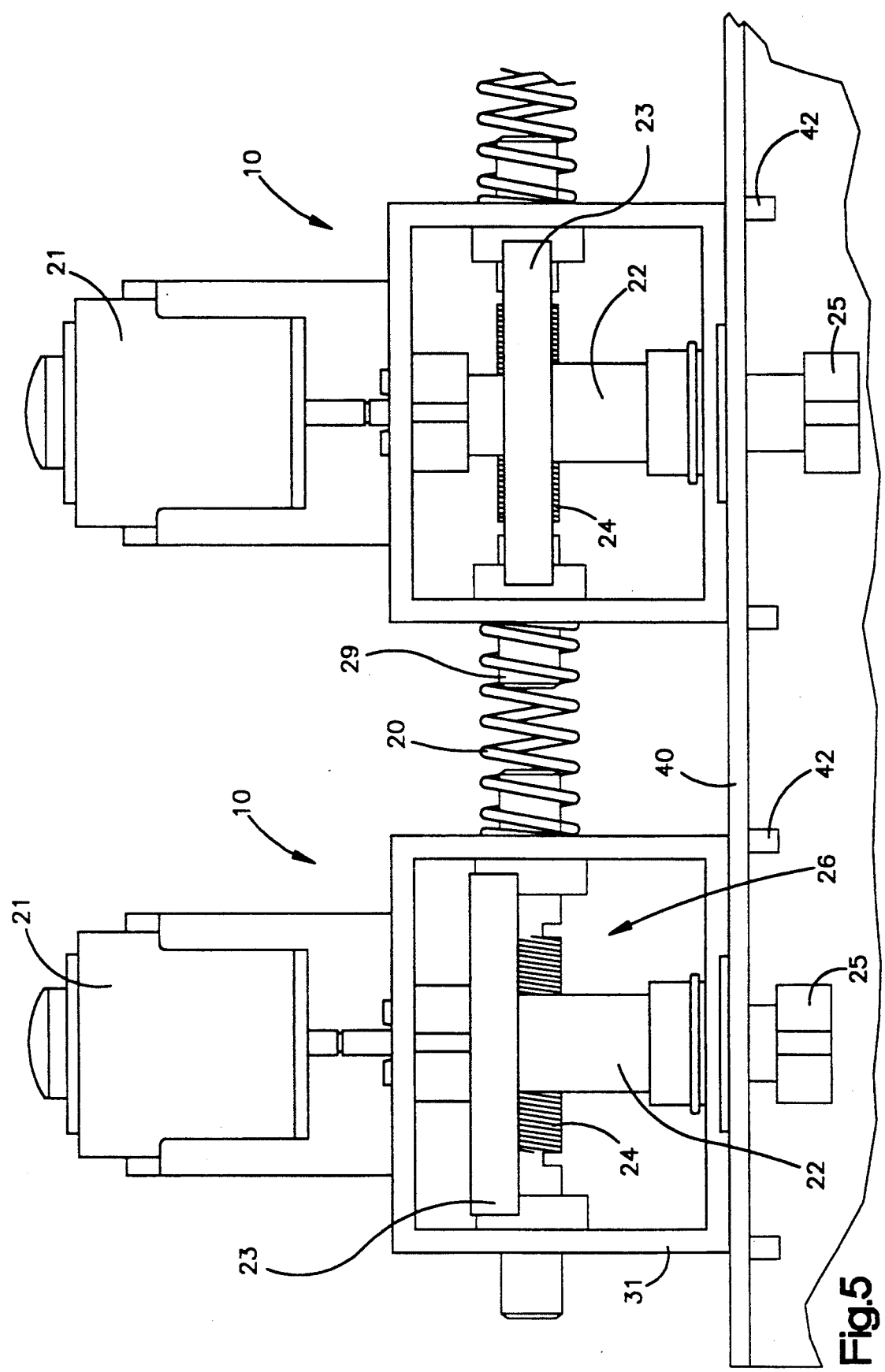
FIG. 5 a top view of two gearing modules in an enlarged scale.

In FIG. 5, two gearing modules 10 are shown in a schematic top view. As already explained, the driven shafts 22 bearing the gear wheel 23 are rotatably mounted in the respective supporting frames 31. The electromagnet 21, also fixed to the supporting frame 31, is operatively coupled to the driven shaft 22. In the gearing module 10 shown at the right side of FIG. 5, the electromagnet 21 is energized and thereby pushes the driven shaft 22 toward the fixing rail 40. Thereby, the gear wheel 23 is engaged with the worm wheel 24 and the coupling member 25 engages the (in FIG. 5 not shown) feeding worm. Thus, a mechanical connection between worm wheel 24 and feeding worm 6 is established.

In the gearing module 10 shown at the left side of FIG. 5, the electromagnet 21 is not energized and thereby the driven shaft 22 is not pushed toward the fixing rail 40, but toward the electromagnet 21 under the influence of the spring member 19 (not shown in FIG. 5, cf. FIG. 4).

Due to the fact that all drive shafts 29 are coupled to each other and to the driving motor 11 by means of resilient coupling members 20, e.g. spiral springs, not only radial but also axial tolerances can be compensated. The gearing modules 10 are suspended in sequentially arranged apertures in the fixing rail 40 by means of guiding hooks 42 and kept in place e.g. by means of resilient snap members (not shown).

In the drink machine according to the invention, only one single driving motor is required to feed the different beverage powders. Thus, the manufacturing costs of the drinks machine is considerably lower and the weight of the drinks machine is decreased which should be an advantage with drink machines that have to be suspended on a wall.

What is claimed is:

1. A drink machine for selectively preparing and dispensing different hot and/or cold drinks prepared by dissolving a beverage powder in hot and/or cold water, said drink machine comprising:
   a housing;
   a water heating means;
   a pump means for feeding water to said water heating means;
   a plurality of stock container means for receiving a stock of beverage powder;
   at least one mixing device for mixing said beverage powder with water;
   each of said plurality of stock container means including feeder means for feeding beverage powder contained in said stock container means to said at least one mixing device;
   a common driving motor means for providing a driving force to drive said feeding means of each stock container means;
   a plurality of gearing means for transferring the driving force to respective feeding means, each gearing means is associated with a respective one of said feeding means of said beverage powder stock container means;
   each of said gearing means having a drive shaft connected to said common driving motor means and a driven shaft for driving said respective feeding means; and
   electro-mechanical means for selectively coupling each gearing means to said respective feeding means.

2. A drink machine according to claim 1, wherein for each gearing means, said drive shaft and said driven shaft are rotatably mounted in a supporting frame, said driven shaft is axially displaceable and extends perpendicularly to said drive shaft, said driven shaft has a gear wheel located in the interior of said supporting frame.

3. A drink machine according to claim 2, wherein for each gearing means, said drive shaft has a worm wheel located in the interior of said supporting frame, said gear wheel on said driven shaft is engagable to and disengagable from said worm wheel by axially displacing said driven shaft.

4. A drink machine according to claim 1, wherein for each gearing means, said electro-mechanical means includes an electromagnet mounted on a supporting frame and which is operatively connected to said driven shaft, a coupling member being mounted at an end of said driven shaft which faces said respective feeding means.

5. A drink machine according to claim 1, wherein for each gearing means, said electro-mechanical means has an electromagnet, said driven shaft has a gear wheel and a coupling member, said drive shaft has a worm wheel, said electromagnet simultaneously effecting the engagement of said gear wheel with said worm wheel and the coupling of said coupling member to said respective feeding means upon energizing of said electromagnet.

6. A drink machine according to claim 1, wherein for each gearing means, a spring means is provided for axially biasing said driven shaft toward a disengaged position.

7. A drink machine according to claim 1, wherein each gearing means of said plurality of gearing means is arranged side by side and have their drive shafts in alignment along a common axis, said drive shafts are coupled to each other and to said driving motor means by means of resilient connecting members.

8. A drink machine according to claim 7, wherein said electro-mechanical means includes an electromagnet for each gearing means, each driven shaft has a gear wheel, each drive shaft has a worm wheel, said electromagnets, said gear wheels, said driven shafts, said worm wheels and said resilient connecting members are individually exchangeable by the operator of the drink machine.

9. A drink machine according to claim 1, wherein each of said feeding means comprises a feeding worm rotatably mounted in the interior of said beverage powder stock container means.

10. A drink machine according to claim 9, wherein for each gearing means, the axis of rotation of said feeding worm is arranged in axial alignment with said driven shaft.

11. A drink machine according to claim 2, wherein for each gearing means, said electro-mechanical means has an electromagnet mounted on said supporting frame, said gearing means together with said electromagnet and said supporting frame being designed as an exchangeable gearing module.

12. A drink machine according to claim 11, wherein said housing comprises a fixing rail having mounted apertures in sequential relationship for mounting said gearing modules to said fixing rail.

13. A drink machine according to claim 12, wherein said gearing modules are mounted to said apertures in said fixing rail by means of guiding hooks provided on each said supporting frame.

14. A drink machine according to claim 2, each of said gearing means can be decoupled and recoupled to said respective feeding means such that a required total feeding time can be divided into a plurality of feeding intervals.

* * * * *